United States Patent

Lace

[11] Patent Number: 5,598,144
[45] Date of Patent: Jan. 28, 1997

[54] ANTI-THEFT VEHICLE SYSTEM

[75] Inventor: Jeffrey J. Lace, Huntington Beach, Calif.

[73] Assignee: Actodyne General, Inc., Huntington Beach, Calif.

[21] Appl. No.: 366,886

[22] Filed: Dec. 30, 1994

[51] Int. Cl.$^6$ .................................................. G08B 13/14
[52] U.S. Cl. ........................ 340/568; 188/111; 280/33.994
[58] Field of Search .................................... 340/568, 539, 340/426, 933, 935; 280/33.994; 188/111, 162; 180/167; 307/10.2; 70/226, 228; 455/345

[56] References Cited

U.S. PATENT DOCUMENTS

| | | | |
|---|---|---|---|
| 1,928,750 | 10/1933 | Apple et al. | 188/162 |
| 1,968,584 | 7/1934 | Apple | 188/162 |
| 2,964,140 | 12/1960 | Berezny | 188/111 |
| 3,029,905 | 4/1962 | Nowak | 188/111 |
| 3,031,037 | 4/1962 | Stollman | 188/111 |
| 3,031,038 | 4/1962 | Chait | 188/111 |
| 3,117,655 | 1/1964 | Skupas et al. | 188/111 |
| 3,157,871 | 11/1964 | Umanoff | 340/539 |
| 3,495,688 | 2/1970 | Isaacks | 188/31 |
| 3,590,962 | 7/1971 | Parker | 188/111 |
| 3,652,103 | 3/1972 | Higgs | 280/33.994 |
| 3,717,225 | 2/1973 | Rashbaum et al. | 188/29 |
| 3,809,191 | 5/1974 | Woodward | 188/106 A |
| 3,820,623 | 6/1974 | Akashi et al. | 180/167 |
| 4,242,668 | 12/1980 | Herzog | 340/539 |
| 4,338,594 | 7/1982 | Holm | 340/568 |
| 4,424,511 | 1/1984 | Alberts, Jr. | 73/646 |
| 4,472,706 | 9/1984 | Hodge et al. | 340/941 |
| 4,577,880 | 3/1986 | Bianco | 280/33.994 |
| 4,591,175 | 5/1986 | Upton et al. | 280/33.994 |
| 4,609,075 | 9/1986 | Snedeker | 188/5 |
| 4,683,461 | 7/1987 | Torre | 340/551 |
| 4,772,880 | 9/1988 | Goldstein et al. | 340/571 |
| 4,809,824 | 3/1989 | Fargier et al. | 188/72.8 |
| 4,868,544 | 9/1989 | Havens | 340/572 |
| 4,908,604 | 3/1990 | Jacob | 340/539 |
| 4,987,406 | 1/1991 | Reid | 340/539 |
| 4,990,890 | 2/1991 | Newby | 340/539 |
| 5,000,297 | 3/1991 | Shaw et al. | 188/156 |
| 5,053,768 | 10/1991 | Dix, Jr. | 340/988 |
| 5,194,844 | 3/1993 | Zelda | 340/426 |
| 5,283,550 | 2/1994 | MacIntyre | 340/539 |
| 5,315,290 | 5/1994 | Moreno et al. | 340/568 |
| 5,357,182 | 10/1994 | Wolfe et al. | 188/162 X |
| 5,394,692 | 3/1995 | Gray | 188/1.12 |
| 5,432,412 | 7/1995 | Harris et al. | 280/33.994 X |

FOREIGN PATENT DOCUMENTS

| | | | |
|---|---|---|---|
| 532472 | 3/1993 | European Pat. Off. | 280/33.994 |
| 2137388 | of 1984 | United Kingdom . | |
| 15476 | 9/1992 | WIPO | 280/33.994 |

Primary Examiner—Thomas Mullen
Attorney, Agent, or Firm—Bliss McGlynn P.C.

[57] ABSTRACT

An anti-theft vehicle system for a vehicle wheel having a rotational axis includes at least one inhibitor disposed within the vehicle wheel to selectively engage the vehicle wheel to prevent the vehicle wheel from rotating about its rotational axis. The anti-theft vehicle system also includes a rotatable structure disposed within the vehicle wheel and cooperating with the inhibitor for moving the inhibitor between an engaged position and a disengaged position with the vehicle wheel.

23 Claims, 3 Drawing Sheets

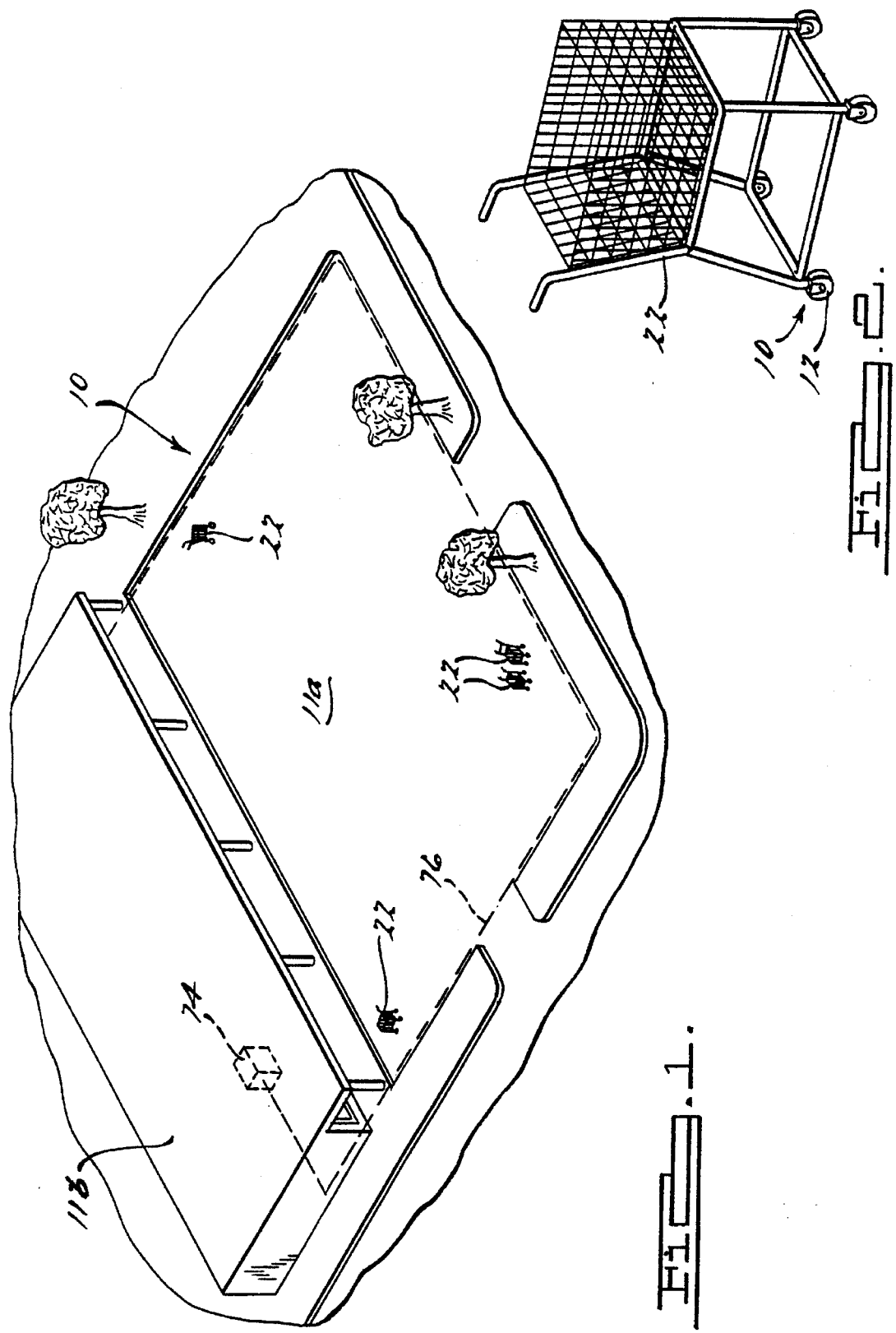

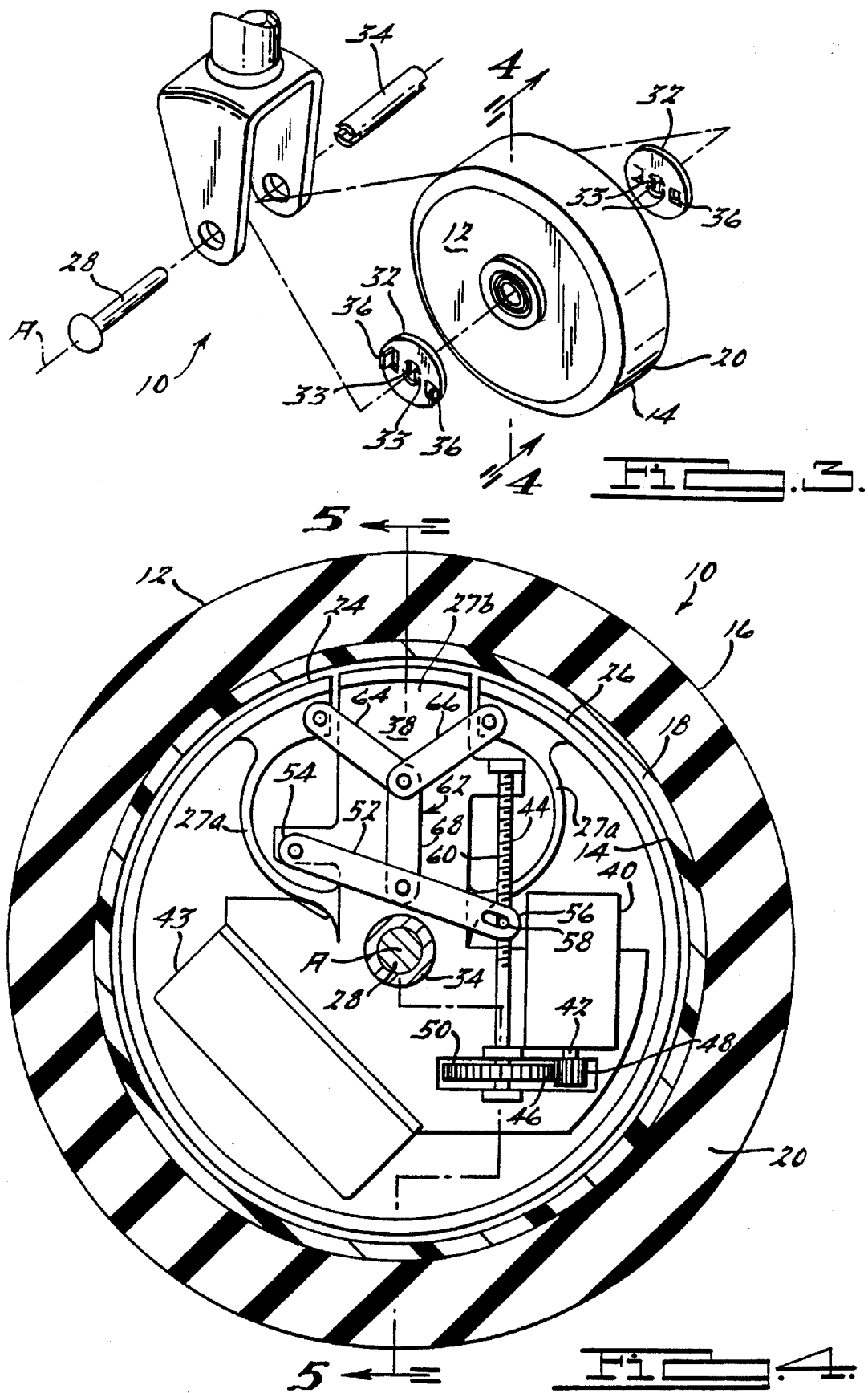

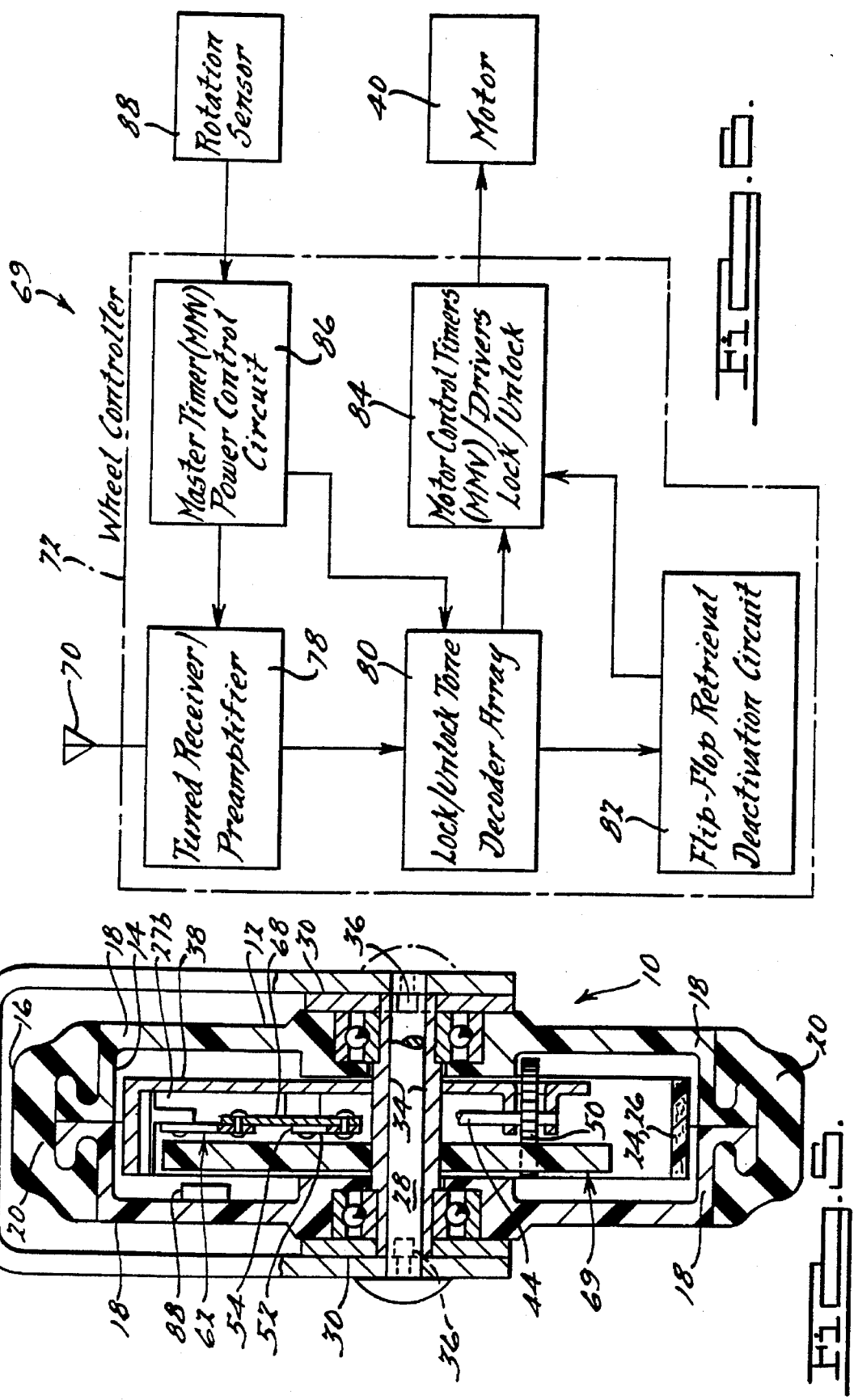

ANTI-THEFT VEHICLE SYSTEM

BACKGROUND OF THE INVENTION

1. Field of the Invention

The present invention relates generally to vehicles and, more particularly, to an anti-theft vehicle system used to inhibit rotation of a vehicle wheel outside a predetermined spatial perimeter.

2. Description of the Related Art

It is sometimes desired to contain a vehicle within a predetermined spatial boundary or perimeter. In particular, retail stores are attempting to reduce the amount of lost vehicles such as shopping carts, which are either stolen or taken out of the normal bounds of the stores and not returned.

Accordingly, U.S. Pat. No. 5,194,844 to Zelda discloses a vehicle theft prevention system which inhibits the use of a shopping cart once it is moved outside a boundary. This patented system includes an electronic wire that extends around and defines a perimeter of normal operating space which is used by operators of a store's shopping carts. The electronic wire produces an electromagnetic field which is sensed by a sensor located adjacent one wheel of the shopping cart. The sensor sends a signal to a motor which moves a brake pad against the wheel of the shopping cart. Two limit switches are used to stop the motor when the motor has either moved the brake pad into or out of engagement with the wheel of the shopping cart.

One disadvantage of the above system is that it is relatively expensive because the motor must be large and two limit switches are needed. Another disadvantage of the above system is that an asymmetric time-variant wave form is used for the electromagnetic field which is undesired.

SUMMARY OF THE INVENTION

It is, therefore, one object of the present invention to provide an anti-theft vehicle system for vehicles.

It is another object of the present invention to provide an anti-theft vehicle system for vehicles such as shopping carts, toys, wheeled inventory, and industrial forklifts.

It is yet another object of the present invention to provide an anti-theft vehicle system for a vehicle wheel to prevent an operator from moving the vehicle outside a predetermined spatial perimeter.

It is still another object of the present invention to provide an anti-theft vehicle system for a shopping cart wheel which is inexpensive and effective at making it difficult for an operator to move the shopping cart out of a predetermined operating area of a retail store.

To achieve the foregoing objects, the present invention is an anti-theft vehicle system for a vehicle wheel having a rotational axis. The anti-theft vehicle system includes at least one inhibitor disposed within the vehicle wheel to selectively engage the vehicle wheel to prevent the vehicle wheel from rotating about its rotational axis. The anti-theft vehicle system also includes rotatable means disposed within the vehicle wheel and cooperating with the inhibitor for moving the inhibitor between an engaged position and a disengaged position with the vehicle wheel.

One advantage of the present invention is that an anti-theft vehicle system is provided for vehicles such as shopping carts, toys, wheeled inventory, and industrial forklifts. Another advantage of the present invention is that the anti-theft vehicle system provides a vehicle wheel which deters an operator from moving the vehicle outside a predetermined spatial perimeter. Yet another advantage of the present invention is that the anti-theft vehicle system provides a cost effective vehicle wheel to deter operators from taking shopping carts out of a retail store's shopping cart boundary by preventing the vehicle wheel from rotating. Still another advantage of the present invention is that the anti-theft vehicle system provides a one-piece brake, springs and component mounting area for the vehicle wheel. A further advantage of the present invention is that the anti-theft vehicle system is self-energizing in both directions. Yet a further advantage of the present invention is that the anti-theft vehicle system provides a linkage overrun for position lock of the vehicle wheel. Still a further advantage of the present invention is that the anti-theft vehicle system changes the angle of a thrust arm to maximize brake linkage efficiency.

Other objects, features and advantages of the present invention will be readily appreciated as the same becomes better understood after reading the subsequent description when considered in connection with the accompanying drawings.

BRIEF DESCRIPTION OF THE DRAWINGS

FIG. 1 is a perspective view of a anti-theft vehicle system, according to the present invention, illustrated in operational relationship with vehicles and a predetermined spatial perimeter.

FIG. 2 is a perspective view of a vehicle and the anti-theft vehicle system of FIG. 1.

FIG. 3 is an exploded view of a wheel of the vehicle and the anti-theft vehicle system of FIG. 2.

FIG. 4 is a sectional view taken along line 4—4 of FIG. 3.

FIG. 5 is a sectional view taken along line 5—5 of FIG. 4.

FIG. 6 is a schematic view of a control circuit of the anti-theft vehicle system of FIGS. 1 through 3.

DESCRIPTION OF THE PREFERRED EMBODIMENT(S)

Referring to FIG. 1, one embodiment of an anti-theft vehicle system 10, according to the present invention, is shown in operational relationship with vehicles inside a predetermined spatial boundary. In one embodiment, the system 10 is used to prevent theft of vehicles such as shopping carts 22 from a predetermined spatial boundary or perimeter 11a of a retail store 11b. It should be appreciated that the system 10 may be used on other vehicles such as toys, wheeled inventory, industrial forklifts to prevent the same from exiting a predetermined spatial boundary.

As illustrated in FIGS. 2 through 5, the system 10 includes at least one wheel 12 for the vehicle embodiment of a shopping cart 22. The wheel 12 has an inner diameter 14 and an outer diameter 16 and a rotational axis A about which the wheel 12 rotates. The wheel 12 also has a housing or hub 18 and a surface engaging member 20. The surface engaging member 20 is made of a suitable material such as a plastic material. Preferably, the plastic material is a urethane material. The hub 18 may be fabricated from the same material as the surface engaging member 20. Preferably, the hub 18 is made of a plastic material such as ABS and secured to the surface engaging member 20.

The system 10 also includes at least one inhibitor 24 disposed within the wheel 12 to selectively engage the wheel 12 and prevent the wheel 12 from rotating about its rotational axis A. The inhibitor 24 is a partial cylindrical shaped brake pad which is forced against the inner diameter 14 or hub 18 of the wheel 12. In one embodiment, a second inhibitor 26 is disposed within the wheel 12 to selectively engage another portion of the hub 18 of the wheel 12. The second inhibitor 26 is also a partial cylindrical shaped brake pad which is forced against the inner diameter 14 of the wheel 12. The inhibitors 24, 26 are integral and made of one-piece. The inhibitors 24, 26 are fabricated from a plastic material, such as a glass reinforced nylon material, which has a memory quality to maintain the shape of the inhibitors 24, 26. The inhibitors 24, 26 have a spring 27a connected to an extension 27b which acts as a component mounting area. The memory quality of the plastic material for the springs 27a creates a spring-like force predisposing the inhibitors 24, 26 to disengage the wheel 12. It should be appreciated that the inhibitors 24, 26, springs 27a and extension 27b are fabricated as one-piece from the same material.

The system 10 further includes an axle pin or shaft 28 which acts as the rotational axis A for the wheel 12. The shaft 28 is made of a metal material such as steel. The system 10 also includes two waterproof bearings 30 and yoke lock plates 32 supported by the shaft 28. The yoke lock plates 32 have internal notches 33 which engage an axle 34 and prevent the axle 34, which rides along the shaft 28, from rotating. The yoke lock plates 32 also include tabs 36 which prevent the waterproof bearings 30 from rotating.

The system 10 includes an axle arm 38 securely mounted such as by welding about the axle 34. The axle arm 34 is a plate made of a metal material such as steel. The extension 27b is connected to the axle arm 38 by suitable means such as an adhesive. The system 10 also includes a motor 40 such as an electric motor mounted to the extension 27b of the inhibitors 24, 26 between the rotational axis A and the inner diameter 14. The motor 40 provides rotational movement independent of the movement of the wheel 12 along an axis defined by a motor shaft 42. The motor 40 receives power from a power source such as a battery 43 which is electrically connected to both the motor 40 and a wheel controller 72 to be described. It should be appreciated that the battery 43 is attached to the extension 27b of the inhibitors 24, 26 by suitable means.

The system 10 further includes a screw or worm gear 44 rotated by the motor 40 through a gear drive 46. The gear drive 46 allows the motor 40 to be placed along side the worm gear 44, conserving space, and reduces the rotational speed of the worm gear 44. More specifically, the gear drive 46 includes a first gear 48 and a second gear 50 such that the second gear 50 has a larger diameter than the first gear 48. The first gear 48 is secured to the motor shaft 42 and rotates at a faster rate than the second gear 50 which is driven by the first gear 48. It should be appreciated that the gear drive 46 may use any number of gears and gear sizes depending on the size and motor speed requirements.

The system 10 also includes a drive arm or lever 52 connected to the inhibitors 24, 26. The lever 52 has a pivotal end 54 and a gear engaging end 56. The gear engaging end 56 receives the worm gear 44 and moves along the worm gear 44 as the worm gear 44 is rotated. The gear engaging end 56 includes a nut 58 for receiving the worm gear 44 therein and rides along the worm gear 44 as the nut 58 receives the threads 60 of the worm gear 44.

The lever 52 pivots about a pivot end 54 which is pivotally secured to the extension 27b of the inhibitors 24, 26. When the lever 52 pivots about the pivot end 54, the inhibitors 24, 26 and the wheel 12 engage to prevent the rotational movement of the wheel 12. If, however, the inhibitors 24, 26 are already engaging the wheel 12, the motor 40 will reverse to pivot the lever 52 back toward the motor 40 to disengage the inhibitors 24, 26 from the wheel 12, allowing the wheel 12 to rotate along with the other wheels of the shopping cart 22.

The system 10 also includes a linkage, generally indicated at 62, to connect the inhibitors 24, 26 to the lever 52. The linkage 62 is connected to the lever 52 between the pivotal end 54 and the gear engaging end 56. The linkage 62 includes a first thrust arm or link 64 and a second thrust arm or link 66 which are pivotally moveable with respect to each other. The first and second links 64 and 66 are pivotally secured to each of the first and second inhibitors, 24 and 26, respectively.

The linkage 62 further includes a transfer arm or principle link 68 which is pivotally secured to the first and second links 64 and 66 and the lever 52. The movement allowed by the principle link 68 forces the first and second links 64 and 66 to move in opposite directions. When the two links 64, 66 move in opposite directions, the first and second inhibitors 24, 26 move in opposite directions, either into engagement or disengagement with the hub 18 of the wheel 12. Although not necessary, the first and second links 64 and 66 are identical in shape and move not only in opposite directions but with equal magnitude. Further, the cost of the system 10 is further reduced by having the first, second and principle links 64, 66 and 68 fabricated to the same shape and size. This reduces the cost of the system 10 further by reducing parts.

Referring to FIG. 6, the anti-theft vehicle system 10 includes a control circuit generally shown at 69, for the system 10. The control circuit 69 is a circuit board overlay which is disposed within the hub 18 of the wheel 12. The control circuit 69 includes a receiver 70 for receiving a signal to activate the motor 40 to move the inhibitors 24, 26 such that the inhibitors 24, 26 either engage or disengage the wheel 12. Preferably, the receiver 70 is an antenna which receives a perimeter signal such as an RF signal created by a signal generator 74 to be described.

The control circuit 69 also includes a wheel controller 72 which receives the signal from the antenna 70 and is electrically connected between the antenna 70 and the motor 40. The wheel controller 72 selectively activates the motor 40 based the perimeter signal received from the antenna 70. The perimeter signal is created by a signal generator 74 and buried wire cable 76 to be described and illustrated in FIG. 1.

The wheel controller 72 includes a tuned receiver 78 which receives the perimeter signal from the antenna 70 and a tone decoder 80. The tuned receiver 78 amplifies the signal and sends it to the tone decoder 80 for decoding the perimeter signal. The wheel controller 72 also includes a flip flop retrieval deactivation circuit 82 and a motor controller timer 84 which receives the signal once it has been decoded. The flip flop retrieval deactivation circuit 82 determines which direction the motor 40 is to rotate the motor shaft 42. More specifically, the flip flop retrieval deactivation circuit 82 will signal the motor controller timer 84 to operate the motor 40 dependent upon the input received by the flip flop retrieval deactivation circuit 82 and the tone decoder 80. The wheel controller 72 includes a master timer 86 which receives input from a rotation sensor 88 such as a magnet of the control circuit 69.

For example, the flip flop retrieval deactivation circuit 82 receives input from the tuned receiver 78 stating the location of the shopping cart 22 has changed such that the shopping cart 22 has passed over the buried wire cable 76 signifying that the shopping cart 22 has passed either into or out of the perimeter defined by the buried wire cable 76. The flip flop retrieval deactivation circuit 82 then determines whether the shopping cart 22 was inside or outside the buried wire cable 76 by determining whether the wheel 12 was rotating. From the rotation sensor 88, determination of the rotation of the wheel 12 will determine whether the shopping cart 22 was inside or outside of the buried wire cable 76. If the rotation sensor 88 receives no signal, the wheel 12 is not rotating and is already locked. Therefore, receiving a signal from the tuned receiver 78 will indicate that the shopping cart 22 has passed back into the perimeter of the allowed area for the shopping cart 22 to operate. The rotational state of the wheel 12 goes from a non-rotating state to a rotating state. If, however, the flip flop retrieval deactivation circuit 82 receives a signal from the tuned receiver 78 when the rotation sensor 88 is sending a signal indicating that the wheel 12 is rotating, it will be determined that the shopping cart 22 has moved to a location outside of the perimeter defined by the buried wire cable 76 and will turn the motor 40 such that the inhibitors 24, 26 will abut the wheel hub 18 preventing the wheel 12 from rotating. Thus, the rotational state of the wheel has gone from a rotating state to a non-rotating state.

The signal generator 74, shown in FIG. 1, generates a square wave output having a low frequency cycle between 60 Hz and 1 kHz which is sent along the buried wire cable 76 and defines the area in which the shopping cart may operate. The signal generator 74 may be any type of signal generator suitable to produce a signal which will pass along the entire length of the buried wire cable 76.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An anti-theft vehicle system for a vehicle wheel having a rotational axis comprising:

at least one inhibitor disposed within the vehicle wheel to selectively engage and disengage the vehicle wheel to resist and allow rotational movement of the vehicle wheel about the rotational axis; rotatable means disposed within the vehicle wheel and cooperating with said at least one inhibitor for moving said at least one inhibitor between an engaged position and a disengaged position with the vehicle wheel; and a receiver mounted within the vehicle wheel to receive an electrical signal to activate said rotatable means.

2. An anti-theft vehicle system as set forth in claim 1 including a motor mounted between said rotational axis and an inner diameter of the vehicle wheel.

3. An anti-theft vehicle system as set forth in claim 2 including a worm gear rotatable by said motor.

4. An anti-theft vehicle system as set forth in claim 3 including a lever connected to said at least one inhibitor and having a pivotal end and a gear engaging end, said gear engaging end receiving said worm gear and moving therealong when said worm gear is rotated by said motor, said lever pivoting about said pivotal end to engage said at least one inhibitor with the wheel to prevent the rotational movement thereof.

5. An anti-theft vehicle system as set forth in claim 4 including a linkage connecting said at least one inhibitor to said lever.

6. An anti-theft vehicle system as set forth in claim 5 wherein said linkage is connected to said lever between said pivotal end and said gear engaging end.

7. An anti-theft vehicle system as set forth in claim 4 wherein said gear engaging end includes a nut for receiving said worm gear therein and for moving along said worm gear as said worm gear rotates.

8. An anti-theft vehicle system for a vehicle wheel comprising:

at least one inhibitor disposed within the vehicle wheel to selectively engage and disengage the vehicle wheel to resist and allow rotational movement of the vehicle wheel;

a motor disposed within the vehicle wheel;

a worm gear rotatable by said motor;

a lever connected to said at least one inhibitor and having a pivotal end and a gear engaging end, said gear engaging end receiving said worm gear and moving therealong when said worm gear is rotated by said motor, said lever pivoting about said pivotal end to engage said at least one inhibitor with the wheel to resist the rotational movement thereof; and a linkage interconnecting said at least one inhibitor and said lever, wherein said linkage includes first and second links pivotally moveable with respect to each other.

9. An anti-theft vehicle system as set forth in claim 8 wherein said linkage further includes a principle link pivotally securing said first and second links to said lever such that movement of said principle link forces said first and second links to move in opposite directions.

10. An anti-theft vehicle system for a vehicle comprising:

a wheel having an inner diameter and a rotational axis;

at least one inhibitor selectively engageable and disengageable with said inner diameter of said wheel to resist and allow rotational movement of said wheel about said rotational axis;

a motor mounted between said rotational axis and said inner diameter, said motor providing rotational movement;

a worm gear rotatable by said motor;

a lever connected to said at least one inhibitor defining a pivotal end and a gear engaging end, said gear engaging end receiving said worm gear and moving therealong when said worm gear is rotated by said motor, said lever pivoting about said pivotal end to engage and disengage said at least one inhibitor with said wheel;

a control system for creating a perimeter signal defining a perimeter;

a transmitter electrically connected to said control system for transmitting said perimeter signal; and an antenna operatively associated with said wheel for receiving said perimeter signal.

11. An anti-theft vehicle system as set forth in claim 10 including a wheel controller electrically connected between said antenna and said motor for selectively activating said motor based on said perimeter signal received from said antenna.

12. An anti-theft vehicle system as set forth in claim 10 including a rotational sensor for sensing rotation of said wheel.

13. An anti-theft vehicle system as set forth in claim 12 wherein said rotational sensor includes a magnet attached to said wheel.

14. An anti-theft vehicle system as set forth in claim 10 including a tone decoder array for decoding said perimeter signal.

15. An anti-theft vehicle system as set forth in claim 10 including a retrieval deactivation circuit, said retrieval deactivation circuit determining if the vehicle is entering or exiting said perimeter.

16. An anti-theft vehicle system as set forth in claim 10 including a receiver for receiving said perimeter signal from said antenna and for amplifying said perimeter the signal.

17. An anti-theft vehicle system as set forth in claim 10 including a linkage connecting said at least one inhibitor to said lever.

18. An anti-theft vehicle system as set forth in claim 17 wherein said linkage being rotatably secured to said lever between said pivotal end and said gear engaging end.

19. An anti-theft vehicle system as set forth in claim 18 wherein said linkage includes first and second links pivotally moveable with respect to each other.

20. An anti-theft vehicle system as set forth in claim 19 wherein said linkage further includes a principle link pivotally securing said first and second links to said lever such that movement of said principle link forces said first and second links to move in opposite directions.

21. An anti-theft shopping cart system for a shopping cart comprising:
    at least one wheel;
    at least one inhibitor disposed within said at least one wheel to selectively engage and disengage said at least one wheel to resist and allow rotation thereof;
    a motor disposed within said at least one wheel;
    a worm gear rotatable by said motor;
    a lever connected to said at least one inhibitor and having a pivotal end and a gear engaging end, said gear engaging end receiving said worm gear and moving therealong when said worm gear is rotated by said motor and said lever pivoting about said pivotal end to engage and disengage said at least one inhibitor with said at least one wheel; and
    a receiver for receiving a perimeter signal defining a perimeter and activating said motor.

22. An anti-theft vehicle system for a vehicle comprising:
    a vehicle wheel;
    at least one inhibitor disposed within said vehicle wheel to selectively engage and disengage said vehicle wheel to resist and allow rotational movement of said vehicle wheel;
    rotatable means disposed within said vehicle wheel and cooperating with said at least one inhibitor for moving said at least one inhibitor between an engaged position and a disengaged position with said vehicle wheel;
    a transmitter for transmitting a predetermined signal; and
    a receiver mounted within said vehicle wheel to receive said predetermined signal to activate said rotatable means.

23. An anti-theft vehicle system for a vehicle comprising:
    at least one wheel;
    at least one inhibitor selectively engageable and disengageable with said wheel to resist and allow rotational movement of said wheel;
    a motor disposed within said wheel and providing rotational movement;
    a worm gear rotatable by said motor;
    a lever connected to said at least one inhibitor defining a pivotal end and a gear engaging end, said gear engaging end receiving said worm gear and moving therealong when said worm gear is rotated by said motor, said lever pivoting about said pivotal end to engage and disengage said at least one inhibitor with said wheel;
    a control system for creating a perimeter signal defining a perimeter;
    a transmitter electrically connected to said control system for transmitting said perimeter signal; and
    a receiver operatively associated with said wheel to receive said perimeter signal to activate said motor.

* * * * *

UNITED STATES PATENT AND TRADEMARK OFFICE
CERTIFICATE OF CORRECTION

PATENT NO. : 5,598,144
DATED : January 28, 1997
INVENTOR(S) : Jeffrey J. Lace

It is certified that error appears in the above-indentified patent and that said Letters Patent is hereby corrected as shown below:

Title page, column 2, under "References Cited, U.S. Patent Documents", "5,394,692" should be --5,394,962--.

Column 5, claim 1, line 6, after axis; start a new paragraph.

Column 7, claim 16, line 3, delete "the".

Signed and Sealed this

Twenty-ninth Day of April, 1997

Attest:

Attesting Officer

BRUCE LEHMAN

Commissioner of Patents and Trademarks